(12) United States Patent
Roquiny et al.

(10) Patent No.: US 7,736,746 B2
(45) Date of Patent: Jun. 15, 2010

(54) GLAZING

(75) Inventors: Philippe Roquiny, Jumet (BE);
Jean-Michel Depauw, Jumet (BE)

(73) Assignee: AGC Glass Europe, Brussels (BE)

( * ) Notice: Subject to any disclaimer, the term of this patent is extended or adjusted under 35 U.S.C. 154(b) by 409 days.

(21) Appl. No.: 11/718,803

(22) PCT Filed: Nov. 8, 2005

(86) PCT No.: PCT/EP2005/055818

§ 371 (c)(1),
(2), (4) Date: May 8, 2007

(87) PCT Pub. No.: WO2006/048463

PCT Pub. Date: May 11, 2006

(65) Prior Publication Data

US 2008/0187692 A1 Aug. 7, 2008

(30) Foreign Application Priority Data

Nov. 8, 2004 (EP) .................................. 04105589

(51) Int. Cl.
*B32B 9/00* (2006.01)

(52) U.S. Cl. ....................... 428/432; 428/428; 428/698; 428/702; 428/212; 428/213; 428/216

(58) Field of Classification Search ........................ None
See application file for complete search history.

(56) References Cited

U.S. PATENT DOCUMENTS

| 4,546,050 | A | 10/1985 | Amberger et al. |
| 5,902,505 | A | 5/1999 | Finley |
| 6,797,389 | B1 | 9/2004 | Depauw |
| 7,198,850 | B2 | 4/2007 | DePauw |
| 7,494,717 | B2 * | 2/2009 | Decroupet et al. .......... 428/428 |
| 2002/0136905 | A1 * | 9/2002 | Medwick et al. ............ 428/432 |
| 2004/0106017 | A1 | 6/2004 | Buhay et al. |
| 2005/0208281 | A1 | 9/2005 | Decroupet et al. |
| 2008/0085404 | A1 | 4/2008 | Novis et al. |
| 2008/0311389 | A1 | 12/2008 | Roquiny et al. |

FOREIGN PATENT DOCUMENTS

| EP | 0719876 | | 7/1996 |
| WO | WO-2004/071984 | * | 8/2004 |

OTHER PUBLICATIONS

U.S. Appl. No. 12/428,708, filed Apr. 23, 2009, Roquiny.
U.S. Appl. No. 11/577,925, filed Apr. 25, 2007, Roquiny, et al.
U.S. Appl. No. 12/532,318, filed Sep. 21, 2009, Depauw, et al.

* cited by examiner

*Primary Examiner*—Ling Xu
(74) *Attorney, Agent, or Firm*—Oblon, Spivak, McClelland, Maier & Neustadt, L.L.P.

(57) ABSTRACT

A glazing suitable for undergoing a thermal treatment such as toughening or bending, comprising a multilayered coating deposited on a glass sheet, and also to a toughened and/or bent glazing and a multiple glazing comprising such a toughened and/or bent glazing. The multilayered coating includes:
  a) a zinc-tin mixed oxide containing at least 12% tin,
  b) a first silver-based infrared reflecting layer,
  d) a dielectric,
  e) a second silver-based infrared reflecting layer,
  g) a zinc-tin mixed oxide containing at least 12% tin,
  h) an upper protective layer based on the nitride or oxynitride of Ti, Zr, Hf, V, Nb, Ta, Cr, alloys thereof, or based on the nitride or oxynitride of the alloy or one or more of these metals with Al and/or B.

The glazing has a high thermal insulation that is most suitable for use in the building industry.

37 Claims, No Drawings

GLAZING

CROSS-REFERENCE TO RELATED APPLICATIONS

This application is the entry into the United States of PCT Application Number PCT/EP/055818 filed Nov. 8, 2005 and claims priority from European Patent Application No. 04105589.8, filed Nov. 8, 2004, the entirely of both of which are hereby incorporated by reference.

BACKGROUND

The present invention relates to a glazing comprising at least one multilayered coating deposited on a glass sheet as well as a multiple glazing comprising at least one such glazing unit.

SUMMARY

The glazing units referred to in the present invention comprise a multilayered coating deposited on a glass sheet, which generally has at least two noble metal-based, in particular silver-based, layers that reflect the infrared radiation and are deposited by reduced-pressure cathodic sputtering in a well-known magnetron-type device.

In addition to their optical functions, in particular with respect to light transparency, these glazing units also have thermal functions. In particular, they have a solar protection function. In this respect, they are used to reduce the risk of excessive overheating of an enclosed space having large glazed surfaces as a result of insulation, and thus to reduce the air-conditioning load to be utilised in summer. For use in buildings they are generally assembled as double glazing in association with another glass sheet, with or without a coating, the multilayered coating being located inside the space between the two glass sheets. When they are used in the automotive sector, they are generally assembled by lamination to another glass sheet, with or without a coating, by way of a film of thermoplastic material such as PVB, the multilayered coating being located between the two glass sheets.

The glazing units that the present invention relates to also have another thermal function, that of a glazing of low emissivity. They are then normally assembled as double glazing with the multilayered coating in contact with a gas (air or other gas), possibly at reduced pressure. As such, they are used to improve the thermal insulation of large glazed surfaces and to thus reduce energy losses and heating costs in cold periods. The multilayered coating of the glazing according to the invention is in fact a low-emissivity coating that reduces heat loss through high wavelength infrared radiation.

To ensure the solar protection function, the glazing that the present invention relates to must allow the least possible amount of total incident solar radiation to pass through, i.e. it must have the lowest possible solar factor (SF). However, it is highly desirable that it assures a light transmission (LT) that is as high as possible in order to provide a sufficient level of illumination inside the building. These somewhat conflicting requirements portray the wish to obtain a glazing that has a high selectivity (S) defined by the relationship of the light transmission to the solar factor. To meet these requirements, the infrared reflective layer must be subdivided into at least two layers separated by a dielectric, and this complicates the structure of the multilayered coating by increasing the number of layers.

The light transmission (LT) is the percentage of incident light flux, of illuminant D65, transmitted by the glazing. The solar factor (SF or g) is the percentage of incident energy radiation transmitted directly by the glazing and also absorbed by this, then radiated by its face facing the energy source.

It is also desirable that the glazing units meet certain aesthetic criteria with respect to light reflection (LR), i.e. the percentage of incident light flux—of illuminant D65—reflected by the glazing, and with respect to colour in reflection and in transmission. The combination of a high selectivity and a low light reflection sometimes leads to purple tints in reflection that have very little aesthetic appeal.

In the building sector, it is frequently necessary to undertake to mechanically strengthen the glazing, such as by thermal toughening, to improve its resistance to mechanical stresses. In the automotive sector, it is also frequently necessary to bend the glazing to provide conformity with the features of the vehicle. In the production and shaping processes of the glazing units there are some advantages in conducting these toughening and bending operations on the already coated substrate instead of coating a substrate that has already been shaped. These operations are conducted at a relatively high temperature, a temperature at which the silver-based infrared reflecting layer tends to deteriorate and lose its optical properties and its properties with respect to infrared radiation. Therefore, very particular precautions must be taken to provide a coating structure that is suitable for undergoing a thermal toughening or bending treatment, sometimes referred to below by the expression "bendable-toughenable", without losing its optical and/or energy-related properties that are the purpose of its existence.

Multilayered coatings with two infrared reflecting layers suitable for undergoing a thermal treatment have already been proposed. From the viewpoint of efficiency and industrial profitability, the difficulty with these relatively complex structures is not only having a glazing comprising such a coating that withstands severe thermal treatments at very elevated temperatures without its properties deteriorating, but also having a glazing, which has a production process that is the least complex possible, can be easily reproduced and can be formed from glass sheets of different thicknesses without any significant modification to the structure of the coating in order to take into account the difference in the sojourn time at elevated temperature of the thermal treatment. Any modification in the duration of the thermal treatment undergone by the glazing can significantly change its properties, in particular its energy-related and/or optical properties, e.g. its light transmission. The duration of the thermal toughening or bending treatment is dependent on the thickness of the glass sheet. When glazing units bearing a multilayered coating are produced in series from glass sheets of different thicknesses, the structure of the coating must therefore be adapted so that after toughening the glazing units all meet the production specifications not only to take into account any possible optical change as a result of the difference in glass thickness, but also to take into account the thermal resistance of the coating, which will be subjected to different conditions.

DETAILED DESCRIPTION

The invention relates to a glazing suitable for undergoing a thermal treatment such as toughening or bending, comprising at least one multilayered coating deposited on a glass sheet, characterised in that, in sequence starting with the glass sheet, the multilayered coating comprises at least:

a) a first dielectric comprising at least one layer composed of a zinc-tin mixed oxide containing at least 12% tin, preferably at least 20% tin, b) a first silver-based infrared reflecting layer,
d) a second dielectric,
e) a second silver-based infrared reflecting layer,
g) a third dielectric comprising at least one layer composed of a zinc-tin mixed oxide containing at least 12% tin, preferably at least 20% tin,
h) an upper protective layer based on the nitride or oxynitride of Ti, Zr, Hf, V, Nb, Ta, Cr, alloys thereof, or based on the nitride or oxynitride of the alloy of one or more of these metals with Al and/or B.

It has been discovered that the base structure of the multi-layered coating of the glazing according to the invention allows the formation of "bendable-toughenable" glazing units that have a low emissivity and a solar protection with high selectivity, can meet demanding aesthetic criteria with excellent reproducibility, and this also being the case with different glass sheet thicknesses. Considering the severity of this type of thermal treatment, the complexity of the structure of the coating and the quality requirements for the glazing units according to the invention, this result is completely surprising.

It appears that the zinc-tin mixed oxide containing at least 12% and preferably at least 20% tin present in the first and third dielectrics plays a favourable role in insulating the silver-based layers in relation to the glass and the environment outside the coating and protecting them from the oxygen migrating through the layers. The beneficial protective effect with respect to oxygen is more pronounced when the mixed oxide contains at least 20% tin. Expressions like "zinc-tin mixed oxide containing at least 12% tin" used in the present description indicate that there is at least 12% by weight of tin in the zinc-tin mixed oxide in relation to the total weight of zinc and tin in the mixed oxide. The same applies to the percentages of zinc in the mixed oxide given below as well as to values other than 12% that is taken here for the purposes of illustration.

The upper protective layer based on the nitride or oxynitride of Ti, Zr, Hf, V, Nb, Ta, Cr, alloys thereof, or based on the nitride or oxynitride of the alloy or one or more of these metals with Al and/or B effectively protects the whole of the underlying structure during handling before thermal treatment as well as during the thermal treatment, during the course of which these nitrides oxidise, e.g. TiN oxidises to essentially form $TiO_2$. This upper protective layer in the form of nitride can be already partially oxidised before the thermal treatment. It may possibly also be covered by another layer such as a final thin layer, for example, that further improves the protection of the coating, as described and claimed, for example, in the European Patent Application 04 105 583.1 in the name of the Applicant filed on the same day.

The upper protective layer advantageously contains titanium nitride or oxynitride. For example, it can contain the nitride or oxynitride of an alloy of aluminium or zirconium or titanium. Preferably, the upper protective layer is TiN-based. This is a material that is well suited to the aims of the invention. It is easily obtained in an industrial production by cathodic sputtering. It effectively protects the coating during handling of the glazing and it readily oxidises, in particular during the thermal treatment, to give $TiO_2$, is highly transparent while protecting the underlying layers from oxidation.

The silver-based infrared reflecting layers can contain alloys of silver with Pd in particular.

The second dielectric can be formed from any suitable material well known in the field of layers deposited by reduced-pressure cathodic sputtering. This dielectric material can be selected in particular from the oxides, nitrides, oxynitrides of metals, e.g. aluminium oxide ($Al_2O_3$), aluminium nitride (AlN), aluminium oxynitride (AlNO), magnesium oxide (MgO), niobium oxide ($Nb_2O_5$), silicon dioxide ($SiO_2$), silicon nitride ($Si_3N_4$), titanium dioxide ($TiO_2$), bismuth pentoxide ($Bi_2O_5$), yttrium oxide ($Y_2O_3$), tin oxide ($SnO_2$), tantalum pentoxide ($Ta_2O_5$), zinc oxide (ZnO), zirconium oxide ($ZrO_2$), or from sulphides such as zinc sulphide (ZnS).

Preferably, the second dielectric comprises at least one layer composed of a zinc-tin mixed oxide, either alone or in association with one or more of the dielectric materials cited above. It was found that this strengthened the resistance of the coating to the thermal treatment.

Besides the layer composed of a zinc-tin mixed oxide, the first and third dielectrics can also include one or more of the dielectric materials cited above.

Alternatively or additionally, at least one of the first, second or third dielectrics is composed of at least two layers of zinc-tin mixed oxide of different compositions, the layer most rich in zinc being deposited the closest to, and preferably in direct contact with, the silver-based infrared reflecting layer coming after it in said sequence. In this case, all the dielectrics preferably comprise at least two layers of zinc-tin mixed oxide of different compositions. Advantageously, the first zinc-tin mixed oxide contains 40 to 60% tin, preferably to form a composition close to zinc stannate, $Zn_2SnO_4$, and the second zinc-tin mixed oxide contains 80 to 98% zinc, preferably about 90% zinc and 10% tin. This results at the same time in a good resistance of the coating to the thermal treatment and a favourable effect on the optical and energy-related properties of the layer or layers of silver in contact with the layer rich in zinc.

A barrier layer is preferably arranged on at least one of the infrared reflecting layers, between this layer and the dielectric that follows it in the sequence. Advantageously, a barrier layer is arranged on each of the infrared reflecting layers. The barrier layer or layers is/are intended to protect the silver-based layers, in particular during the thermal treatment, but also during the deposition of the upper dielectrics, especially if these are formed in an atmosphere containing oxygen, which could oxidise the silver, or in an atmosphere containing nitrogen. A metal that oxidises more readily than silver can be used, such as titanium (Ti), niobium (Nb), tantalum (Ta), zinc (Zn), copper (Cu), aluminium (Al), chromium (Cr), for example, or nickel-chromium alloy (NiCr), mixtures or alloys thereof. A suboxide such as NiCrOx or TiOx can also be used. TiOx may possibly be deposited using a TiOx ceramic target in a neutral atmosphere.

Preferably, the or at least one of the barrier layers comprises a first thin film of metal or metal compound and is covered by a second thin film of a compound of a different metal from the first thin film, the two films being arranged between the infrared reflecting layer and the dielectric following in the sequence. Advantageously, all the barrier layers comprise a first thin film of metal or metal compound and are covered by a second thin film of a compound of a different metal from the first thin film, the two films both being arranged between the infrared reflecting layer and the dielectric following in the sequence. By choosing the materials of the two thin films wisely, it is possible to obtain a more effective protection of the silver layers by allocating a different role to each of the films.

Preferably, the or at least one of the barrier layers is formed by a first thin film of NiCr or suboxide of NiCr arranged directly on the silver, and it is covered by a second thin film of $TiO_2$ arranged on the thin film of NiCr or suboxide of NiCr and under the dielectric that follows in the sequence. Preferably, all the barrier layers are formed by a first thin film of NiCr and they are each covered by a second thin film of $TiO_2$. The film of $TiO_2$ retains oxygen and the film of NiCr reduces the diffusion of oxygen towards the silver, and as a result a highly effective protection of the silver is obtained. The thin film of $TiO_2$ can be deposited in suboxide form, e.g. from a TiOx ceramic target in a neutral or oxidising atmosphere. Preferably, it is deposited in metallic form (Ti) and it is oxidised by the oxidising atmosphere used to depositing the following layer. In any case, after deposition of the coating at the outlet of the magnetron, this film is in substantially oxidised form, $TiO_2$. As regards the NiCr film, it oxidises strongly essentially during the course of the thermal treatment of the coated glazing.

For very hot countries, it is beneficial if the final glazing assembled in the form of double glazing has a solar factor lower than 30% and even lower than 25% so as to filter solar energy as far as possible. In this case, it is not sufficient to block the infrared rays, it is also necessary to filter the energy carried by the visible radiation in order to adequately reduce the total energy transmitted by the glazing. An absorbent layer such as a metal like titanium, zirconium, niobium or other metals known in the field, their suboxides or nitrides, can then be inserted into the structure of the coating. The invention enables readily reproducible glazing units of this type to be obtained. However, a lower light transmission must then be accepted that can drop to below 40%.

Advantageously, the multilayered coating is such that, when it is deposited on a clear soda-lime float glass sheet with a thickness of 4 mm, the glazing according to the invention, which is suitable for undergoing a thermal treatment such as toughening or bending, has a light transmission LT, on the basis of illuminant D65/10°, of at least 65%, and preferably of at least 68%, an external light reflection LR, on the basis of the same illuminant, of less than 12%, preferably less than or equal to 9%, and a solar factor SF, evaluated on the glass side in accordance with standard ISO 9050 (2003) of less than or equal to 46%, preferably less than or equal to 45%. These properties enable a glazing, which has a high light transmission while being particularly beneficial with respect to the solar protection, to be obtained after thermal treatment.

Preferably, the multilayered coating is such that, when it is deposited on a clear soda-lime float glass sheet with a thickness of 4 mm, the glazing according to the invention, which is suitable for undergoing a thermal treatment such as toughening or bending, has a tint examined in reflection on the glass side on the basis of illuminant D65/10°, represented by a value for $L^*$ in the range of between 28 and 37, a value for $a^*$ in the range of between −2 and +4 and a value for $b^*$ in the range of between −21 and −3, advantageously between −20 and −8. These optical characteristics allow a glazing to be obtained after thermal treatment that has very high aesthetic appeal and can meet particularly severe criteria. Advantageously, the tint examined in transmission on the basis of illuminant D65/2° is represented by a negative value for $a^*$ and a value for $b^*$ of less than +10, preferably less than +5.

Preferably, the glazing according to the invention has an emissivity 8 equal to or less than 0.035 and advantageously equal to or less than 0.03. Low values for the coefficient U (or k) can also be obtained, and this is very beneficial for conserving heat in winter.

The invention is particularly applicable to glazing units where the glass sheet has a thickness of 2 to 6 mm. However, the quality of its coating and its particularly favourable resistance to thermal treatment permit a more significant thickness for the glass sheet. As a consequence of this, according to another preferred embodiment of the invention the glass sheet has a thickness in the range of between 6 and 14 mm. In order to conduct a thermal treatment on glass sheets of such thickness, these must be subjected to a substantially elevated temperature for a longer period. The glazing according to the invention adapts particularly well to these difficult conditions.

Preferably, the multilayered coating essentially has the following structure starting with the glass:

20-45 nm ZnSnOx/9-11 nm Ag/first barrier layer/70-85 nm ZnSnOx/13-15 nm Ag/second barrier layer/20-40 nm ZnSnOx/2-6 nm TiN. By using this structure it has been found that glazing units of high quality can readily be obtained, because of the solar control and thermal insulation, that are easily reproduced, even with different glass thicknesses. ZnSnOx represents a zinc-tin mixed oxide containing at least 20% tin.

Advantageously, the multilayered coating essentially has the following structure starting with the glass:

29-37 nm zinc-tin mixed oxide with more than 40% Sn and more than 30% Zn/5-13 nm zinc-tin mixed oxide with more than 80% Zn and more than 2% Sn/9-11 nm Ag/0.5-2 nm NiCr/2-6 nm $TiO_2$/65-80 nm zinc-tin mixed oxide with more than 40% Sn and more than 30% Zn/8-15 nm zinc-tin mixed oxide with more than 80% Zn and more than 2% Sn/13-15 nm Ag/0.5-2 nm NiCr/2-6 nm $TiO_2$/5-13 nm zinc-tin mixed oxide with more than 80% Zn and more than 2% Sn/15-30 nm zinc-tin mixed oxide with more than 40% Sn and more than 30% Zn/2-6 nm TiN. Advantageously, the zinc-tin mixed oxides with more than 40% Sn and more than 30% Zn are compositions close to zinc stannate $Zn_2SnO_4$. It has been found that this structure provides a range of optical and energy-related properties after toughening that allows glazing units to be obtained that perfectly meet a market demand with respect to buildings.

The glazing according to the invention such as described above is a glazing that is not normally provided as is for installation. The glazing provided with its multilayered coating must still undergo a thermal toughening and/or bending treatment before being installed. This allows a toughened and/or bent glazing, which is effective with respect to solar protection, has high selectivity and thermal insulation and an aesthetically pleasing appearance, to be obtained easily and in a readily reproducible manner. In general, the thermal treatment of the glazing is not conducted directly after deposition of the multilayered coating. It can be sold as is, for example, and then transported to a customer. This latter will then proceed with a suitable thermal treatment before installing it into a building, for example.

This thus coated and thermally treated glazing is novel in itself, and this is the reason why the invention is extended to a toughened and/or bent glazing formed by a glazing as described above that has undergone a thermal toughening and/or bending treatment after deposition of the multilayered coating.

The invention also relates to a toughened and/or bent glazing comprising at least one multilayered coating deposited on a glass sheet before the thermal toughening and/or bending treatment, characterised in that, in sequence starting with the glass sheet, the multilayered coating comprises at least:

a) a first dielectric comprising at least one layer composed of a zinc-tin mixed oxide containing at least 12%, preferably at least 20% tin, b) a first silver-based infrared reflecting layer, c) a first barrier layer, d) a second dielectric, e) a second silver-based infrared reflecting layer, f) a second barrier layer, g) a third dielectric comprising at least one layer composed of a zinc-tin mixed oxide containing at least 12%, preferably at least 20% tin, h) an upper protective layer containing or based on the oxide of Ti, Zr, Hf, V, Nb, Ta or Cr, or a mixture of these oxides, and in that at least one of the barrier layers comprises a first thin film of metal or metal compound and is covered by a second thin film of a compound of a different metal from the first thin film, the two films being arranged between the infrared reflecting layer and the dielectric following in the sequence.

By choosing the thicknesses of the different layers of this structure wisely, it is possible to reliably obtain a choice of glazing structures with high-performance thermal functions and high selectivity of the solar control, with an aesthetically pleasing appearance that meets all the required criteria, in particular in the building sector.

The upper protective layer advantageously contains titanium oxide, which can either come from the oxidation of the nitride or oxynitride of titanium, or the oxidation of metallic or sub-oxidised titanium. It can, for example, contain an oxide of an alloy of chromium, aluminium or zirconium with titanium. Preferably, the upper protective layer is titanium oxide-based.

The upper protective layer can possibly also be coated with another layer such as a final thin layer, for example, that further improves the protection of the coating, as described and claimed, for example, in the European Patent Application 04 105 583.1 in the name of the Applicant filed on the same day.

Preferably, all the barrier layers comprise a first thin film of metal or metal compound and are covered by a second thin film of a compound of a different metal from the first thin film, the two films both being arranged between the infrared reflecting layer and the dielectric following in the sequence.

In particular, the multilayered coating of the toughened and/or bent glazing according to the invention is such that, when it is deposited on a clear soda-lime float glass sheet with a thickness of 4 mm, the glazing advantageously has a light transmission LT, on the basis of illuminant D65/2°, of at least 73%, and preferably of at least 75%, an external light reflection LR, on the basis of the same illuminant, of less than 12%, preferably less than or equal to 9%, and a solar factor SF, evaluated on the glass side in accordance with standard ISO 9050 (2003) of less than 50%, preferably less than 49%. This provides a glazing with a very high performance with respect to solar protection having a high selectivity and low light reflection. From an aesthetic viewpoint, the multilayered coating is such that, when it is deposited on a clear soda-lime float glass sheet with a thickness of 4 mm, the glazing preferably has a tint examined in reflection on the glass side, on the basis of illuminant D65/10°, represented by a value for L* in the range of between 28 and 37, a value for a* in the range of between −2 and +2 and a value for b* in the range of between −2 and −10. This provides it with a visual appearance that is pleasing to look at and that is readily compatible with the landscape overall. Advantageously, the tint in transmission on the basis of illuminant D65/2° is represented by a negative value for a* and a value for b* of less than +5.

Preferably, the emissivity of the glazing is equal to or less than 0.03 and advantageously equal to or less than 0.025. The glazing according to the invention has a lower emissivity after thermal treatment than before. This is an advantage particular to the glazing according to the invention that allows particularly low values of the coefficient U to be obtained for a toughened and/or bent glazing, all other optical and thermal properties being equal.

Preferably, the multilayered coating of the toughened and/or bent glazing according to the invention has the following structure starting with the glass:

20-45 nm ZnSnOx/9-11 nm Ag/first barrier layer/70-85 nm ZnSnOx/13-15 nm Ag/second barrier layer/20-40 nm ZnSnOx/2-6 nm $TiO_2$. And advantageously, it has the following structure starting with the glass:

29-37 nm zinc-tin mixed oxide with more than 40% Sn and more than 30% Zn/5-13 nm zinc-tin mixed oxide with more than 80% Zn and more than 2% Sn/9-11 nm Ag/0.5-2 nm NiCrOx/2-6 nm $TiO_2$/65-80 nm zinc-tin mixed oxide with more than 40% Sn and more than 30% Zn/8-15 nm zinc-tin mixed oxide with more than 80% Zn and more than 2% Sn/13-15 nm Ag/0.5-2 nm NiCrOx/2-6 nm $TiO_2$/5-13 nm zinc-tin mixed oxide with more than 80% Zn and more than 2% Sn/15-30 nm zinc-tin mixed oxide with more than 40% Sn and more than 30% Zn/2-6 nm $TiO_2$. Advantageously, the zinc-tin mixed oxides with more than 40% Sn and more than 30% Zn are compositions close to zinc stannate $Zn_2SnO_4$. This structure provides glazing units with high-performance thermal functions that can be produced particularly reliably on a large scale and can be formed from glass sheets with substantially different thicknesses without modification to the structure of the coating.

The possibility of obtaining glazing units, wherein the coating has undergone a thermal toughening and/or bending treatment and the glass sheets have significantly different thicknesses with the same structure of coating, and having equivalent optical and thermal properties, is novel and surprising in itself. In fact, hitherto the severity of the thermal toughening or bending treatments has required the structure of the multilayered coating to be adapted according to the thickness of the glass sheets in order to preserve the same optical and/or energy-related properties, since the duration of this treatment changes in dependence on the thickness of the glass.

Therefore, the invention is also extended to an assembly of glazing units such as those described above that are suitable for undergoing a thermal treatment such as toughening or bending, or are toughened and/or bent, comprising at least two glazing units, wherein the glass sheets have thicknesses that differ by more than 10% and bear multilayered coatings that have the same structure of layers, while including the thicknesses of each of the layers or films that are identical to at least 1% difference, the two glazing units having a similar appearance after thermal treatment.

Preferably, said assembly of glazing units comprises at least one glazing, wherein the thickness of the glass sheet is in the range of between 2 and 7 mm, and a glazing, wherein the thickness of the glass sheet is in the range of between 7 and 14 mm, and these two glass sheets bear multilayered coatings that have the same structure as the layers, while including the thicknesses of each of the layers or films that are identical to at least 1% difference. This very small difference is really surprising. In fact, it includes only the slight adaptation that must be made, essentially to the thickness of the third dielectric, to take into account the optical change resulting from the difference in thickness of the glass. Since the coating has an excellent resistance to thermal treatment, it is not necessary to adapt it to the duration of the treatment. Another way of illustrating this special feature is to subject several identical coated glazing units to different durations of thermal treatment at high temperature to confirm that the optical and thermal properties do not change significantly. The advantage with respect to large-scale production is obvious.

The invention is extended further to a multiple glazing comprising at least one glazing such as that described above that is suitable for undergoing a thermal toughening treatment, which provides favourable thermal insulation, effective solar protection with high selectivity and a pleasing aesthetic appearance, and that has optical and energy-related properties such as those indicated in the following claims.

The invention shall now be described in more detail in a non-restrictive manner on the basis of the following preferred practical examples.

EXAMPLES

Example 1

A 2 m by 1 m sheet of standard soda-lime glass with a thickness of 4 mm is placed in a magnetron-type cathodic sputtering device operated by means of a magnetic field at reduced pressure (about 0.3 Pa). A multilayered coating is deposited on this glass sheet comprising in sequence:

a) a first dielectric formed by two oxide layers deposited in a reactive atmosphere formed from a mixture of argon and oxygen from zinc-tin alloy cathodes of different compositions. The first zinc-tin mixed oxide with a thickness of about 30 nm is formed from a cathode of a zinc-tin alloy with 52% by weight of zinc and 48% by weight of tin to form the spinel structure of zinc stannate $Zn_2SnO_4$. The second zinc-tin mixed oxide $ZnSnO_x$ of approximately 5 nm is deposited from a target of a zinc-tin alloy with 90% by weight of zinc and % by weight of tin.

b) A first infrared reflecting layer formed from about 10.3 nm of silver from a target of practically pure silver in a neutral atmosphere of argon.

c) A first barrier layer formed from a first thin film of NiCr with a thickness of 0.5 nm deposited from a target of an alloy with 80% Ni and 20% Cr. This barrier layer is covered by a second thin film with a thickness of 2.5 nm deposited from a titanium target. These thin films are both deposited in a flux of argon lightly contaminated with oxygen from the adjacent chambers. It should be noted that the oxidising atmosphere of the plasma during deposition of the following layer, described below, totally oxidises the thin film of titanium such that at the end of the deposition process of the second dielectric the titanium is virtually totally oxidised to form a compact layer of $TiO_2$. As a variant, it is also possible to deposit the layer in the form of partially oxidised TiOx. This layer can also be deposited, for example, from a TiOx ceramic target and be oxidised by the plasma used for the deposition of the following layer.

d) A second dielectric formed from two layers of zinc-tin mixed oxides deposited in a reactive atmosphere formed from a mixture of oxygen and argon from cathodes of zinc-tin alloys of different compositions. The first zinc-tin mixed oxide with a thickness of about 68 nm is deposited from a metallic target of an alloy of ZnSn with 52% Zn and 48% Sn (by weight) to form the spinel structure of zinc stannate $Zn_2SnO_4$. The second zinc-tin mixed oxide $ZnSnO_x$ with a thickness of about 15 nm is deposited from a target of an alloy of ZnSn with 90% Zn and 10% Sn (by weight).

e) A second infrared reflecting layer formed by about 14.7 nm of silver from a target of practically pure silver in an atmosphere formed from 100% argon.

f) A second barrier layer formed from a first thin film of 0.5 of NiCr and covered by a second thin film of 2.5 nm of Ti in the same way as for the first barrier layer.

g) A third dielectric formed from two layers of oxides deposited in a reactive atmosphere formed by a mixture of oxygen and argon from cathodes of zinc-tin alloys of different compositions. The first zinc-tin mixed oxide $ZnSnO_x$ with a thickness of about 5 nm is deposited from a metallic target of an alloy of ZnSn with 90% Zn and 10% Sn (by weight). The second zinc-tin mixed oxide with a thickness of about 30 nm is deposited from a target of an alloy of ZnSn with 52% Zn and 48% Sn (by weight) to form the spinel structure of zinc stannate $Zn_2SnO_4$.

h) The coating is then finished by the deposition of a 2.5 nm upper protective layer of TiN deposited in an atmosphere of nitrogen from a titanium target.

It should be noted that all the layers of $ZnSnO_x$ are sufficiently oxidised to be as transparent as possible. It should also be noted that the thicknesses of Ti and TiN are given as equivalent thickness of $TiO_2$ (i.e. as a result of the oxidation of Ti or TiN), which is their state in the finished product after thermal treatment, and is already the state even in the intermediate glazing that is suitable for undergoing a thermal treatment with respect to Ti.

When it leaves the layer deposition device with the multilayered coating having been deposited on the glass sheet, the freshly coated glazing has the following properties:

LT=73.2%; LR=8.3%; SF=44.1% $\epsilon$ (emissivity)=0.03;

the tint in transmission is expressed by the following values:

L*=88.5; a*=−4.2; b*=+1.9 the tint in reflection on the glass side is expressed by the following values:

L*=34.7; a*=+0.6; b*=−12.1; $\lambda_d$=470.1 nm; purity=21.9%.

In the present invention, the following collective terms are used for the measured or calculated values. Light transmission (LT), light reflection (LR) and tint in transmission (1976 CIELAB values L*a*b*) are measured with illuminant D65/2°. With respect to the tint in reflection, the 1976 CIELAB values (L*a*b*) as well as the dominant wavelength ($\lambda_d$) and the purity (p) are measured with illuminant D65/10°. The solar factor (SF or g) is calculated in accordance with standard ISO 9050/2003. The value U (coefficient k) and emissivity ($\epsilon$) are calculated in accordance with standards EN673 and ISO 10292.

The coated glazing with the multilayered coating deposited on the glass sheet then undergoes a thermal toughening operation, during which it is exposed to a temperature of 690° C. for 4 minutes and then cooled suddenly by jets of cold air. During this thermal treatment, the thin films of NiCr of the barrier layers are oxidised sufficiently to be transparent while also forming an effective and reliable screen to protect the silver layers. The upper protective layer of TiN is itself oxidised to form $TiO_2$.

After this treatment, the coated and toughened glazing has the following properties:

LT=81.6%; LR=8.2%; SF=49% $\epsilon$ (emissivity)=0.022;

the tint in transmission is expressed by the following values:

L*=88.5; a*=−4.2; b*=+1.9 the tint in reflection on the glass side is expressed by the following values:

L*=34.5; a*=−0.8; b*=−7.6; % D=472.6 nm; p=14.9%.

This coated glazing is then assembled as double glazing with another 4 mm clear glass sheet, the coating being arranged on the side of the internal space of the double glazing. The space between the two sheets is 15 mm and the air therein is replaced by argon. When looking at the double glazing on the glass side of the coated glazing, the coating being placed in position 2, i.e. when viewed from the glass side, the glazing provided with the coating is seen first and then the clear glass sheet without a layer, the following properties are noted:

LT=73.7%; LR=13.6%; SF=43.4%; S=1.7 value U=1.05 W/(m²·K);

the tint in transmission is expressed by the following values:

L*=88.8; a*=−3.4; b*=+3.0 the tint in reflection on the glass side is expressed by the following values:

L*=43.7; a*=−1.7; b*=−4.7; λD=475.8 nm; p=8.7%.

Visual examination in reflection of the double glazing shows a uniform tint and appearance over the entire surface. Therefore, the invention enables a double glazing to be obtained with a high light transmission, high energy performance (thermal insulation and sunshield protection) and a very high aesthetic appeal.

Example 2

Example 2 is performed in the same way as Example 1 with the same structure of the multilayered coating. It differs from Example 1 in the thickness of the glass sheet bearing the coating, which is 8 mm instead of 4 mm. The properties obtained are as follows:

When it leaves the layer deposition device, the freshly coated glazing has the following properties:

LT=71.5%; LR=8.1%; SF=43.3% ε (emissivity)=0.03;

the tint in transmission is expressed by the following values:

L*=87.7; a*=−5.1; b*=+2.0 the tint in reflection on the glass side is expressed by the following values:

L*=34.4; a*=+0.3; b*=−11.6; $\lambda_d$=470.6 nm; purity=21.4%.

The coated glazing with the multilayered coating deposited on the glass sheet then undergoes a thermal toughening operation, during which it is exposed to a temperature of 690° C. for 8 minutes and then cooled suddenly by jets of cold air.

After this treatment, the coated and toughened glazing has the following properties:

LT=79.7%; LR=8.1%; SF=47.9% ε (emissivity)=0.022;

the tint in transmission is expressed by the following values:

L*=91.6; a*=−3.4; b*=+3.0 the tint in reflection on the glass side is expressed by the following values:

L*=34.2; a*=−1.1; b*=−7.2; $\lambda_D$=473.2 nm; p=14.6%.

This coated and toughened glazing is then assembled as double glazing with another 4 mm clear glass sheet, the coating being arranged on the side of the internal space of the double glazing. The space between the two sheets is 15 mm and the air therein is replaced by argon. When looking at the double glazing on the glass side of the coated glazing, the coating being placed in position 2, i.e. when viewed from the glass side, the glazing provided with the coating is seen first and then the clear glass sheet without a layer, the following properties are noted:

LT=72%; LR=13.2%; SF=41.8%; S=1.7 value U=1.05 W/(m²·K);

the tint in transmission is expressed by the following values:

L*=88.0; a*=−4.2; b*=+3.1

To the tint in reflection on the glass side is expressed by the following values:

L*=43.1; a*=−2.3; b*=−4.4; % D=477.1 nm; p=8.8%.

When the double glazing of Example 1 is placed in the same position beside the double glazing of Example 2, the visual appearance is the same. Moreover, the energy-related properties are comparable. Therefore, these two double glazing units can even be installed close to one another in the same building. Thus, it is confirmed that it is not necessary to modify the structure of the multilayered coating when the thickness of the glass sheet changes in order to obtain the same properties, and this is a great advantage from the viewpoint of large-scale production.

Examples 3 to 6

The following examples are performed in the same way as Example 1. The structures of the corresponding coatings are given in Table 1 below (D1=first dielectric, D2=second dielectric, D3=third dielectric, IR1=first silver-based infrared reflecting layer, IR2=second infrared reflecting layer, P1=first barrier layer, P2=second barrier layer, CS=upper protective layer; $ZSO_5$=zinc-tin mixed oxide obtained by cathodic sputtering in an oxidising atmosphere from a metallic target of a ZnSn alloy with 52% Zn and 48% Sn; $ZSO_9$=zinc-tin mixed oxide obtained by cathodic sputtering in an oxidising atmosphere from a metallic target of a ZnSn alloy with 90% Zn and 10% Sn; $L_{RV}^*$, $a_{RV}^*$, $b_{RV}^*$ represent the 1976 CIELAB values for the tint in reflection on the glass side; $\lambda_{d(RV)}$ and $p_{(RV)}$ represent the dominant wavelength and the purity of the tint in reflection on the glass side). The glass sheets of Examples 3 to 5 have a thickness of 4 mm and that of Example 6 has a thickness of 6 mm.

TABLE 1

| Ex. | D1 (nm) | IR1 (nm) | P1 (nm) | | D2 (nm) | IR2 (nm) | P2 (nm) | | D3 (nm) | | CS (nm) |
|---|---|---|---|---|---|---|---|---|---|---|---|
| 3 | ZSO5 (22) | ZSO9 (9) | Ag (10.3) | NiCr (1) | Ti (2.5) | ZSO5 (70) | ZSO9 (8.5) | Ag (14.7) | NiCr (1) | Ti (2.5) | ZSO9 (8.5) | ZSO5 (24) | TiN (3.0) |
| 4 | ZSO5 (22) | ZSO9 (9) | Ag (10.3) | NiCr (1) | Ti (2.5) | ZSO5 (72) | ZSO9 (9) | Ag (14.6) | NiCr (1) | Ti (2.7) | ZSO9 (11) | ZSO5 (29) | TiN (2.5) |
| 5 | ZSO5 (27) | ZSO9 (9) | Ag (10.3) | NiCr (1) | Ti (2.4) | ZSO5 (71) | ZSO9 (12) | Ag (14.5) | NiCr (1) | Ti (2.4) | ZSO9 (9) | ZSO5 (20) | TiN (3.0) |
| 6 | ZSO5 (27) | ZSO9 (9) | Ag (10.3) | NiCr (1) | Ti (2.5) | ZSO5 (71) | ZSO9 (12) | Ag (14.7) | NiCr (1) | Ti (2.5) | ZSO9 (9) | ZSO5 (25) | TiN (2.5) |

The optical and energy-related properties of the coated glazing units at the outlet of the layer deposition device are given in Table 2.

TABLE 2

| Ex. | LT (%) | LR (%) | SF (%) | $\epsilon$ | $L_{RV}^*$ | $a_{RV}^*$ | $b_{RV}^*$ | $\lambda_{d(RV)}$ (nm) | $p_{(RV)}$ (%) |
|---|---|---|---|---|---|---|---|---|---|
| 3 | 72.0 | 6.5 | 41.6 | 0.030 | 31.5 | 3.1 | −17.5 | — | — |
| 4 | 70.1 | 7.0 | 41.5 | 0.025 | 32.5 | 3.6 | −20.3 | 467.8 | 35.4 |
| 5 | 66.3 | 9.0 | 39.7 | 0.030 | 35.5 | −1.7 | −14.2 | — | — |
| 6 | 69.8 | 7.9 | 43.2 | 0.030 | 34.3 | 3.4 | −16.4 | 466.7 | 27.6 |

The optical and energy-related properties of the coated glazing units after having undergone a thermal toughening treatment as in Example 1 are given in Table 3.

TABLE 3

| Ex. | LT (%) | LR (%) | SF (%) | $\epsilon$ | $L_{RV}^*$ | $a_{RV}^*$ | $b_{RV}^*$ | $\lambda_{d(RV)}$ (nm) | $p_{(RV)}$ (%) |
|---|---|---|---|---|---|---|---|---|---|
| 3 | 82.6 | 6.2 | 47.5 | 0.020 | 30.0 | 0.9 | −7.2 | 468.6 | 14.1 |
| 4 | 81.2 | 7.5 | 47.4 | 0.018 | 33.0 | −0.3 | −8.7 | 471.5 | 17.1 |
| 5 | 75.5 | 9.4 | 45.9 | 0.020 | 36.7 | −3.9 | −3.9 | 480.2 | 10.4 |
| 6 | 80.4 | 8.5 | 49.8 | 0.020 | 35.1 | 1.0 | −5.5 | 466.8 | 9.5 |

The optical and energy-related properties of the coated glazing units assembled as double glazing in the same way as in Example 1, with a 6 mm clear glass sheet, are given in Table 4.

TABLE 4

| Ex. | LT (%) | LR (%) | SF (%) | S | U (or g) W/(m$^2$·K) | $L_{RV}^*$ | $a_{RV}^*$ | $b_{RV}^*$ | $\lambda_{d(RV)}$ (nm) | $p_{(RV)}$ (%) |
|---|---|---|---|---|---|---|---|---|---|---|
| 3 | 74.2 | 11.7 | 41.9 | 1.8 | 1.04 | 40.8 | −1.2 | −3.8 | 475.2 | 7.3 |
| 4 | 74.1 | 13.0 | 42.2 | 1.8 | 1.03 | 42.8 | −1.6 | −5.4 | 475.1 | 9.9 |
| 5 | 68.2 | 14.0 | 40.2 | 1.7 | 1.08 | 44.2 | −4.1 | −2.1 | 483.3 | 6.5 |
| 6 | 71.8 | 13.7 | 43.7 | 1.6 | 1.04 | 43.8 | −0.8 | −3.2 | 474.4 | 5.6 |

The invention claimed is:

1. A glazing suitable for undergoing a thermal treatment such as toughening or bending, comprising at least one multilayered coating deposited on a glass sheet, wherein, in sequence starting with the glass sheet, the multilayered coating comprises at least:
    a) a first dielectric comprising at least one layer having a thickness of 20-45 nm composed of a zinc-tin mixed oxide containing at least 12% tin;
    b) a first silver-based infrared reflecting layer having a thickness of 9-11 nm;
    c) a first barrier layer;
    d) a second dielectric comprising at least one layer of ZnSnOx having a thickness of 70-85 nm;
    e) a second silver-based infrared reflecting layer having a thickness of 13-15 nm;
    f) a second barrier layer;
    g) a third dielectric comprising at least one layer composed of a zinc-tin mixed oxide having a thickness of 20-40 nm containing at least 12% tin; and
    h) an upper protective layer having a thickness of 2-6 nm based on the nitride or oxynitride of Ti, Zr, Hf, V, Nb, Ta, Cr, alloys thereof, or based on the nitride or oxynitride of the alloy of one or more of these metals with Al and/or B.

2. A glazing according to claim 1, wherein the upper protective layer is TiN-based.

3. A glazing according to claim 1, wherein the second dielectric further comprises at least one layer composed of a zinc-tin mixed oxide.

4. A glazing according to claim 1, wherein at least one of the first, second or third dielectrics further comprise at least two zinc-tin mixed oxide layers of different compositions, the layer most rich in zinc being deposited the closest to the silver-based infrared reflecting layer coming after it in said sequence.

5. A glazing according to claim 4, wherein all the dielectrics further comprise at least two layers of zinc-tin mixed oxide of different compositions.

6. A glazing according to claim 4, wherein the first zinc-tin mixed oxide contains 40 to 60% tin, preferably to form a composition close to zinc stannate, $Zn_2SnO_4$, and the second zinc-tin mixed oxide contains
    (i) 80 to 98% zinc, or
    (ii) about 90% zinc and 10% tin.

7. A glazing according to claim 1, further comprising a barrier layer arranged on at least one of the infrared reflecting layers, between this infrared reflecting layer and the dielectric that follows it in the sequence.

8. A glazing according to claim 7, further comprising a barrier layer arranged on each of the infrared reflecting layers.

9. A glazing according to claim 7, wherein at least one of the barrier layers further comprises a first thin film of metal or metal compound and is covered by a second thin film of a compound of a different metal from the first thin film, the two films being arranged between the infrared reflecting layer and the dielectric following in the sequence.

10. A glazing according to claim 9, wherein all the barrier layers further comprise a first thin film of metal or metal compound and are covered by a second thin film of a compound of a different metal from the first thin film, the two films both being arranged between the infrared reflecting layer and the dielectric following in the sequence.

11. A glazing according to claim 9, wherein at least one of the barrier layers is formed by a first thin film of NiCr or suboxide of NiCr arranged directly on the silver, and is covered by a second thin film of $TiO_2$ arranged on the thin film of NiCr or suboxide of NiCr and under the dielectric that follows in the sequence.

12. A glazing according to claim 1, wherein the multilayered coating is such that, prior to thermal treatment when it is deposited on a clear soda lime float glass sheet with a thickness of 4 mm, the glazing has
 a light transmission LT, on the basis of illuminant D65/2°, of at least 65%,
 an external light reflection LR, on the basis of the same illuminant, of less than 12%, and
 a solar factor SF, evaluated on the glass side in accordance with standard ISO 9050 (2003), of less than or equal to 46%.

13. A glazing according to claim 12, wherein the multilayered coating is such that, prior to thermal treatment when it is deposited on a clear soda lime float glass sheet with a thickness of 4 mm, the glazing has a light transmission LT, on the basis of illuminant D65/2°, of at least 68%, an external light reflection LR, on the basis of the same illuminant, of less than or equal to 9%, and a solar factor SF, evaluated on the glass side in accordance with standard ISO 9050 (2003), of less than or equal to 45%.

14. A glazing according to claim 1, wherein the multilayered coating is such that, when it is deposited on a clear soda-lime float glass sheet with a thickness of 4 mm, it has a tint examined in reflection on the glass side on the basis of illuminant D65/10°, represented by a value for L* in the range of between 28 and 37, a value for a* in the range of between −2 and +4 and a value for b* in the range of between −21 and −3.

15. A glazing according to claim 1, wherein the multilayered coating is such that, when it is deposited on a clear soda-lime float glass sheet with a thickness of 4 mm, it has a tint examined in transmission on the basis of illuminant D65/2° represented by a negative value for a* and a value for b* of
 (i) less than +10, or
 (ii) less than +5.

16. A glazing according to claim 1, wherein the glazing has an emissivity ε
 (i) equal to or less than 0.035, or
 (ii) equal to or less than 0.03.

17. A glazing according to claim 1, wherein the glass sheet has a thickness in the range of between 6 and 14 mm.

18. A toughened and/or bent glazing, wherein the glazing is formed from a glazing according to claim 1, which has undergone a thermal toughening and/or bending treatment after deposition of the multilayered coating.

19. A glazing according to claim 18, wherein the upper protective layer is titanium oxide-based.

20. A glazing according to claim 18, wherein the multilayered coating is such that, when it is deposited on a clear soda-lime float glass sheet with a thickness of 4 mm, the glazing has
 a light transmission LT, on the basis of illuminant D65/2°, of at least 73%,
 an external light reflection LR, on the basis of the same illuminant, of less than 12%, and
 a solar factor SF, evaluated on the glass side in accordance with standard ISO 9050 (2003), of less than 50%.

21. A glazing according to claim 20, wherein the multilayered coating is such that, when it is deposited on a clear soda-lime float glass sheet with a thickness of 4 mm, the glazing has a light transmission LT, on the basis of illuminant D65/2°, of at least 75%, an external light reflection LR, on the basis of the same illuminant, of less than or equal to 9%, and a solar factor SF, evaluated on the glass side in accordance with standard ISO 9050 (2003), of less than 49%.

22. A glazing according to claim 18, wherein the multilayered coating is such that, when it is deposited on a clear soda-lime float glass sheet with a thickness of 4 mm, the glazing has a tint examined in reflection on the glass side on the basis of illuminant D65/10° represented by a value for L* in the range of between 28 and 37, a value for a* in the range of between −2 and +2 and a value for b* in the range of between −2 and −10.

23. A glazing according to claim 18, wherein the multilayered coating is such that, when it is deposited on a clear soda-lime float glass sheet with a thickness of 4 mm, the glazing has a tint examined in transmission on the basis of illuminant D65/2° represented by a negative value for a* and a value for b* of less than +5.

24. A glazing according to claim 18, wherein an emissivity ε of the glazing is
 (i) equal to or less than 0.03, or
 (ii) equal to or less than 0.025.

25. A multiple glazing comprising at least one glazing according to claim 18, wherein when the multiple glazing is formed by 2 clear glass sheets with a thickness of 4 mm, it has a light transmission LT of at least 68%, an external light reflection LR of less than 15%, a solar factor SF of less than 45% evaluated in accordance with standard ISO 9050 (2003) and a selectivity S higher than 1.63.

26. A multiple glazing according to claim 25, wherein the multiple glazing has a light transmission LT of
 (i) at least 70%, or
 (ii) at least 72% or
 (iii) at least 73%,
an external light reflection LR of less than 14%, a solar factor SF of less than 44% and a selectivity S
 (i) higher than or equal to 1.68, or
 (ii) higher than or equal to 1.7.

27. A multiple glazing according to claim 25, wherein the multiple glazing has an appearance that is neutral in reflection from the outside when the multilayered coating is in position 2, with a purity of less than 10 and a dominant wavelength equal to or less than 500 nm on the basis of illuminant D65/10°.

28. A multiple glazing according to claim 25, wherein when the multiple glazing is formed from 2 clear glass sheets with a thickness of 4 mm and is examined in reflection on the basis of illuminant D65/10° with the multilayered coating placed in position 2, it has a tint represented by a value for L* in the range of between 40 and 45, a value for a* in the range of between −5.0 and +1 and a value for b* in the range of between −7.0 and −1.0.

29. A multiple glazing according to claim 25, wherein the multiple glazing has a tint examined in transmission on the basis of illuminant D65/2° represented by a negative value for a* and a value for b* of less than +5.

30. A multiple glazing according to claim 25, wherein the multiple glazing's value U in accordance with standard ISO 10292 is
 (i) equal to or less than 1.1 W/(m²·K), or
 (ii) equal to or less than 1.08 W/(m²·K), or
 (iii) equal to or less than 1.05 W/(m²·K), for a space between the glass sheets of 15 mm filled with essentially pure argon.

31. A multiple glazing according to claim 25, wherein the multiple glazing's value U in accordance with standard ISO 10292 is
(i) equal to or less than 1.42 W/(m²·K), or
(ii) equal to or less than 1.4 W/(m²·K), or
(iii) equal to or less than 1.37 W/(m²·K),
for a space between the glass sheets of 15 mm filled with dry air.

32. An assembly of glazing units, either each unit comprising the glazing according to claim 1, wherein the assembly comprises at least two glazing units, wherein the glass sheets have thicknesses that differ by more than 10% and bear multilayered coatings that have the same structure of layers, while the thicknesses of the respective first and third dielectrics have no more than a 3% difference, thicknesses of the respective second dielectrics have no more than a 1% difference, and thicknesses of the respective infrared reflecting layers have no more than a 1% difference, the two glazing units after thermal treatment having a tint difference examined in reflection on the glass side on the basis of illuminant D65/10° represented by a difference in value for $L^* \leq 1$, a difference in value for $a^* \leq 2$ and a difference in value for $b^* \leq 2$.

33. An assembly of glazing units according to claim 32, wherein the assembly comprises at least one glazing, wherein the thickness of the glass sheet is in the range of between 2 and 7 mm, and a glazing, wherein the thickness of the glass sheet is in the range of between 7 and 14 mm, and in that these two glass sheets bear multilayered coatings that have the same structure of layers, while including the thicknesses of each of the layers or films that are identical to at least 1% difference.

34. A glazing suitable for undergoing a thermal treatment such as toughening or bending, comprising at least one multilayered coating deposited on a glass sheet, wherein, in sequence starting with the glass sheet, the multilayered coating comprising:
a) a first dielectric comprising
i) 29-37 nm zinc-tin mixed oxide containing more than 40% Sn and more than 30% Zn, and
ii) 5-13 nm zinc-tin mixed oxide containing more than 80% Zn and more than 2% Sn;
b) a first silver-based infrared reflecting layer having a thickness of 9-11 nm;
c) a first barrier comprising
i) 0.5-2 nm NiCr, and
ii) 2-6 nm $TiO_2$;
d) a second dielectric comprising
i) 65-80 nm zinc-tin mixed oxide containing more than 40% Sn and more than 30% Zn, and
ii) 8-15 nm zinc-tin mixed oxide containing more than 80% Zn and more than 2% Sn;
e) a second silver-based infrared reflecting layer having a thickness of 13-15 inn;
f) a second barrier comprising
i) 0.5-2 nm NiCr, and
ii) 2-6 nm $TiO_2$;
g) a third dielectric comprising
i) 5-13 nm zinc-tin mixed oxide containing more than 80% Zn and more than 2% Sn, and
ii) 5-30 nm zinc-tin mixed oxide containing more than 40% Sn and more than 30% Zn; and
h) an upper protective layer of TiN having a thickness of 2-6 nm.

35. A toughened and/or bent glazing comprising at least one multilayered coating deposited on a glass sheet before the thermal toughening and/or bending treatment, wherein, in sequence starting with the glass sheet, the multilayered coating comprises at least:
a) a first dielectric comprising at least one layer having a thickness of 20-45 nm composed of a zinc-tin mixed oxide containing at least 12% tin;
b) a first silver-based infrared reflecting layer having a thickness of 9-11 nm;
c) a first barrier layer;
d) a second dielectric comprising at least one layer of ZnSnOx having a thickness of 70-85 nm;
e) a second silver-based infrared reflecting layer having a thickness of 13-15 nm;
f) a second barrier layer;
g) a third dielectric comprising at least one layer having a thickness of 20-40 nm composed of a zinc-tin mixed oxide containing at least 12% tin;
(h) an upper protective layer having a thickness of 2-6 nm containing or based on the oxide of Ti, Zr, Hf, V, Nb, Ta or Cr, or a mixture of these oxides;
and wherein at least one of the barrier layers comprises a first thin film of metal or metal compound and is covered by a second thin film of a compound of a different metal from the first thin film, the two films being arranged between the infrared reflecting layer and the dielectric following in the sequence.

36. A glazing according to claim 35, wherein the upper protective layer is titanium oxide-based.

37. A toughened and/or bent glazing comprising at least one multilayered coating deposited on a glass sheet before the thermal toughening and/or bending treatment, wherein, in sequence starting with the glass sheet, the multilayered coating comprising:
a) a first dielectric comprising
i) 29-37 nm zinc-tin mixed oxide with more than 40% Sn and more than 30% Zn, and
ii) 5-13 nm zinc-tin mixed oxide with more than 80% Zn and more than 2% Sn;
b) a first silver-based infrared reflecting layer having a thickness of 9-11 nm;
c) a first barrier comprising
i) 0.5-2 nm NiCrOx, and
ii) 2-6 nm $TiO_2$;
d) a second dielectric comprising
i) 65-80 nm zinc-tin mixed oxide containing more than 40% Sn and more than 30% Zn
ii) 8-15 nm zinc-tin mixed oxide containing more than 80% Zn and more than 2% Sn;
e) a second silver-based infrared reflecting layer having a thickness of 13-15 nm;
f) a second barrier comprising
i) 0.5-2 nm NiCrOx, and
ii) 2-6 nm $TiO_2$;
g) a third dielectric comprising
i) 5-13 nm zinc-tin mixed oxide containing more than 80% Zn and more than 2% Sn, and
ii) 15-30 nm zinc-tin mixed oxide containing more than 40% Sn and more than 30% Zn; and
(h) an upper protective layer of $TiO_2$ having a thickness of 2-6 nm.

* * * * *